United States Patent [19]
Frenkel et al.

[11] Patent Number: 5,267,435
[45] Date of Patent: Dec. 7, 1993

[54] THRUST DROOP COMPENSATION METHOD AND SYSTEM

[75] Inventors: Richard G. Frenkel, Belmont; James A. Huffman, Topsfield; Jonathan A. Rennert, Belmont; Dominic Stasio, Wakefield, all of Mass.

[73] Assignee: General Electric Company, Cincinnati, Ohio

[21] Appl. No.: 931,639

[22] Filed: Aug. 18, 1992

[51] Int. Cl.⁵ .............................................. F02K 1/15
[52] U.S. Cl. ........................................ 60/204; 60/242
[58] Field of Search ............... 60/204, 233, 235, 238, 60/242

[56] References Cited

U.S. PATENT DOCUMENTS

| | | | |
|---|---|---|---|
| 3,747,344 | 7/1973 | Porter et al. | 60/242 |
| 4,139,887 | 2/1979 | Levesque | 60/242 |
| 4,159,625 | 7/1979 | Kerr | 60/242 |
| 4,294,069 | 10/1981 | Camp | 60/238 |
| 4,313,167 | 1/1982 | Brown . | |
| 4,321,791 | 3/1982 | Caroll . | |
| 4,337,615 | 7/1982 | LaCroix . | |
| 4,455,820 | 6/1984 | Buckley, Jr. et al. . | |
| 4,467,600 | 8/1984 | Peikert | 60/242 |
| 4,581,889 | 4/1986 | Carpenter et al. | 60/204 |
| 5,012,420 | 4/1991 | Walker et al. . | |
| 5,048,285 | 9/1991 | Schmitt et al. . | |

Primary Examiner—Louis J. Casaregola
Attorney, Agent, or Firm—Jerome C. Squillaro; Bernard E. Shay

[57] ABSTRACT

A control system and method provide thrust droop compensation in a gas turbine engine. A droop compensation signal is generated for increasing turbine exit temperature $T_5$ based on a predetermined model, and is selectively reduced for limiting the increase in temperature $T_5$ when the temperature $T_5$ is above a predetermined threshold temperature for a predetermined time. The reduced droop signal is added as a bias signal into an error signal which effects thrust droop concentration in a variable area exhaust nozzle of the engine.

12 Claims, 3 Drawing Sheets

THRUST DROOP COMPENSATION METHOD AND SYSTEM

The present invention relates generally to aircraft gas turbine engines, and more specifically to a control system and method for reducing thrust droop due to transient increases in turbine blade tip clearance during engine acceleration.

BACKGROUND OF THE INVENTION

A gas turbine engine such as that used for powering an aircraft in flight includes a turbine rotor having a plurality of circumferentially spaced apart blades having tips spaced radially inwardly from a surrounding stator shroud for defining a predetermined clearance therebetween. The turbine extracts energy from hot combustion gases channeled between the blades which gases are exhausted from the engine to generate propulsive thrust. Gases which leak through the blade tip clearance decrease the efficiency of the engine and resulting thrust. Accordingly, the blade tip clearance is made as small as possible to minimize leakage therethrough without effecting undesirable tip rubs of the blades with the stator shrouds during operation.

Thrust droop is a conventionally known phenomenon which occurs during engine accelerations from low power to high power in which the thrust droops below its steady-state maximum level for up to several minutes. It is especially significant in cold engines wherein the turbine rotor and stator shroud have not reached steady-state temperature, and are still differentially expanding.

More specifically, during engine acceleration, the temperature of combustion gases increases which heats both the turbine rotor and stator shroud. The stator shroud has a fast thermal response and therefore increases in radius relatively quickly compared to the increase in diameter of the turbine rotor which has a relatively slow thermal response. Accordingly, the blade tip clearance transiently increases due to the greater expansion of the stator shroud over the turbine rotor which increases the leakage of the combustion gases therethrough leading to thrust droop. As the temperature of the turbine rotor reaches its steady-state value after the engine acceleration, the blade tip clearance will be reduced to its steady-state value which will eliminate thrust droop.

Accordingly, thrust droop is a transient occurrence whose effect varies from insignificant levels to substantial levels depending primarily on whether the engine is initially cold or hot. In a cold engine, which occurs immediately after engine startup and during idle or low power cruise operation, the turbine rotor and stator shroud are operated at their lowest temperatures and are therefore relatively cold. Upon occurrence of engine acceleration, thrust droop will occur since both the turbine rotor and stator shroud are significantly heated by the exhaust gases for increasing output power, with the stator expanding substantially faster than the rotor. In a hot engine, in contrast, the turbine rotor and stator shroud are already at an elevated temperature and, therefore, engine acceleration does not lead to significant temperature increase thereof. Accordingly, significant thrust droop does not occur. And, in a warm engine having a temperature between cold and hot, varying amounts of thrust droop will occur. Of course, the terms cold, warm, and hot are relative, but they are used herein to indicate the degree of blade tip clearance increase upon engine acceleration from maximum to intermediate to substantially no increase, respectively.

One method and apparatus for compensating for thrust droop in an aircraft gas turbine engine is disclosed in U.S. Pat. No. 4,581,889—Carpenter et al, entitled "Gas Turbine Engine Control," assigned to the present assignee. Carpenter et al disclose an augmented two spool engine having a variable area exhaust nozzle (VEN) in which thrust droop compensation is effected by selectively varying the exhaust are of the VEN to vary the turbine exit exhaust gas temperature designated $T_5$. Carpenter et al disclose the use of two thermal models represented by LaPlace Transforms for expansion of the turbine rotor and stator shroud to infer the increase in blade tip clearance, and, therefore, infer thrust droop. The VEN is modulated in response thereto for selectively increasing the turbine exit temperature $T_5$ to transiently increase thrust to compensate for thrust droop based on the thermal models. However, this thrust droop compensation method includes no provision for determining whether the engine is either hot, warm, or cold and, therefore, can reduce life of the turbine due to increase in turbine exit temperature $T_5$ when not needed for thrust droop compensation.

SUMMARY OF THE INVENTION

A control system and method provide thrust droop compensation in a gas turbine engine. A droop compensation signal is generated for increasing turbine exit temperature $T_5$ based on a predetermined model, and is selectively reduced for limiting the increase in temperature $T_5$ when the temperature $T_5$ is above a predetermined threshold temperature for a predetermined time. The reduced droop signal is added as a bias signal into an error signal which effects thrust droop compensation in a variable area exhaust nozzle of the engine.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
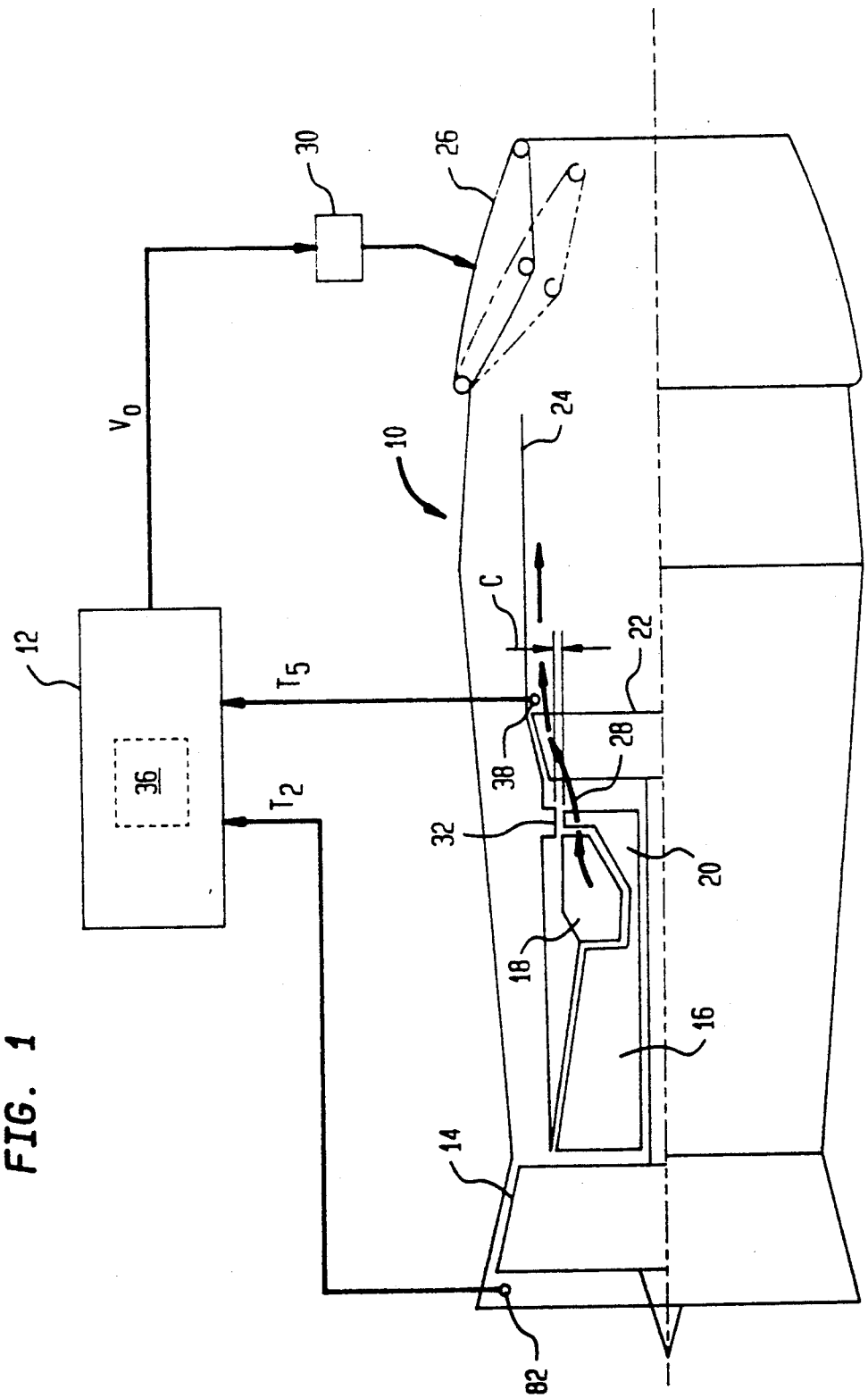
FIG. 1 is a schematic representation of an augmented, turbofan gas turbine engine for powering an aircraft in flight having a thrust droop compensation control system in accordance with one embodiment of the present invention.

Illustrated schematically in FIG. 1 is an exemplary augmented, turbofan gas turbine engine 10 having a controller 12 in accordance with one embodiment of the present invention. The engine 10 conventionally includes in serial flow communication a fan or low pressure compressor 14, a high pressure compressor (HPC) 16, a combustor 18, a high pressure turbine (HPT) 20, a low pressure turbine (LPT) 22, an afterburner or augmenter 24, and a variable area exhaust nozzle (VEN) 26. The fan 14 is powered by the LPT 22 through a shaft extending therebetween, and the HPC 16 is powered by the HPT 20 by another shaft extending therebetween. Combustion or exhaust gases 28 are conventionally generated in the combustor 18 and flow in turn through the HPT 20 and the LPT 22 which extract energy therefrom. The exhaust gases 28 are discharged from the LPT 22 and flow through the afterburner 24 and are discharged from the engine through the VEN 26 for generating thrust for powering an aircraft.

In dry operation of the engine 10, the exhaust gases 28 simply flow through the afterburner 24 without additional energy added thereto. In wet operation of the engine 10, additional fuel is mixed with the exhaust gases 28 and ignited in the afterburner 24 in a conventional manner for increasing the thrust therefrom. The exhaust flow area of the VEN 26 is selectively varied by selectively repositioning the VEN 26 by a conventional actuator 30. The controller 12, which may include a conventional digital electronic control (DEC), receives various conventional inputs from the engine 10 for controlling its various functions such as fuel flow to the combustor 18 and to the afterburner 24 and for controlling the VEN 26, for example.

Figure 2:
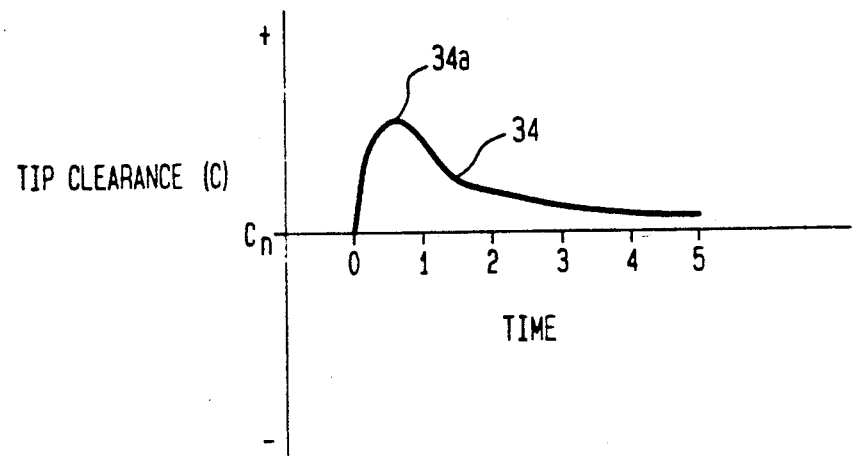
FIG. 2 is a graph plotting turbine blade tip clearance versus time for the high pressure turbine of the engine illustrated in FIG. 1.

Surrounding the radially outer tips of the rotor blades of the HPT 20 is a conventional stator shroud 32 which is spaced radially outwardly therefrom to define a blade tip clearance C therebetween which has a predetermined nominal value, designated $C_n$, which is preselected for minimizing leakage of the exhaust gases 28 therethrough while preventing undesirable tip rubs of the blades with the shroud 32 during operation. Illustrated in FIG. 2 is an exemplary graph plotting the blade tip clearance C on the ordinate versus time on the abscissa. The abscissa itself has a tip clearance value of $C_n$ representing the nominal blade tip clearance between the rotor blades and the shroud 32. The graph plots an exemplary transient curve 34 which occurs upon engine acceleration from relatively low to relatively high power when the engine is also relatively cold.

More specifically, when additional output power is required from the engine 10, additional fuel is provided in the combustor 18 and the temperature of the exhaust gases 28 increases which therefore heats the HPT 20 and the stator shroud 32. The stator shroud 32 grows radially outwardly faster than the HPT 20 in view of their different thermal inertias, which transiently increases the tip clearance C to a maximum value designated 34a in FIG. 2 relative to the nominal clearance $C_n$. The increase in tip clearance C then decreases over time as the temperature of the HPT 20 rises to match the temperature of the stator shroud 32, with a corresponding increase in diameter thereof, which transiently returns the tip clearance C to its nominal value $C_n$ upon reaching steady-state. The increased tip clearance C represented by the transient curve 34 illustrated in FIG. 2 increases leakage of the exhaust gases 28 therethrough which results in a transient decrease in thrust from the engine 10 during operation, which is conventionally known as thrust droop.

One method and control system for compensating for such thrust droop is presented by Carpenter et al disclosed above, and is incorporated herein by reference.

Figure 3:
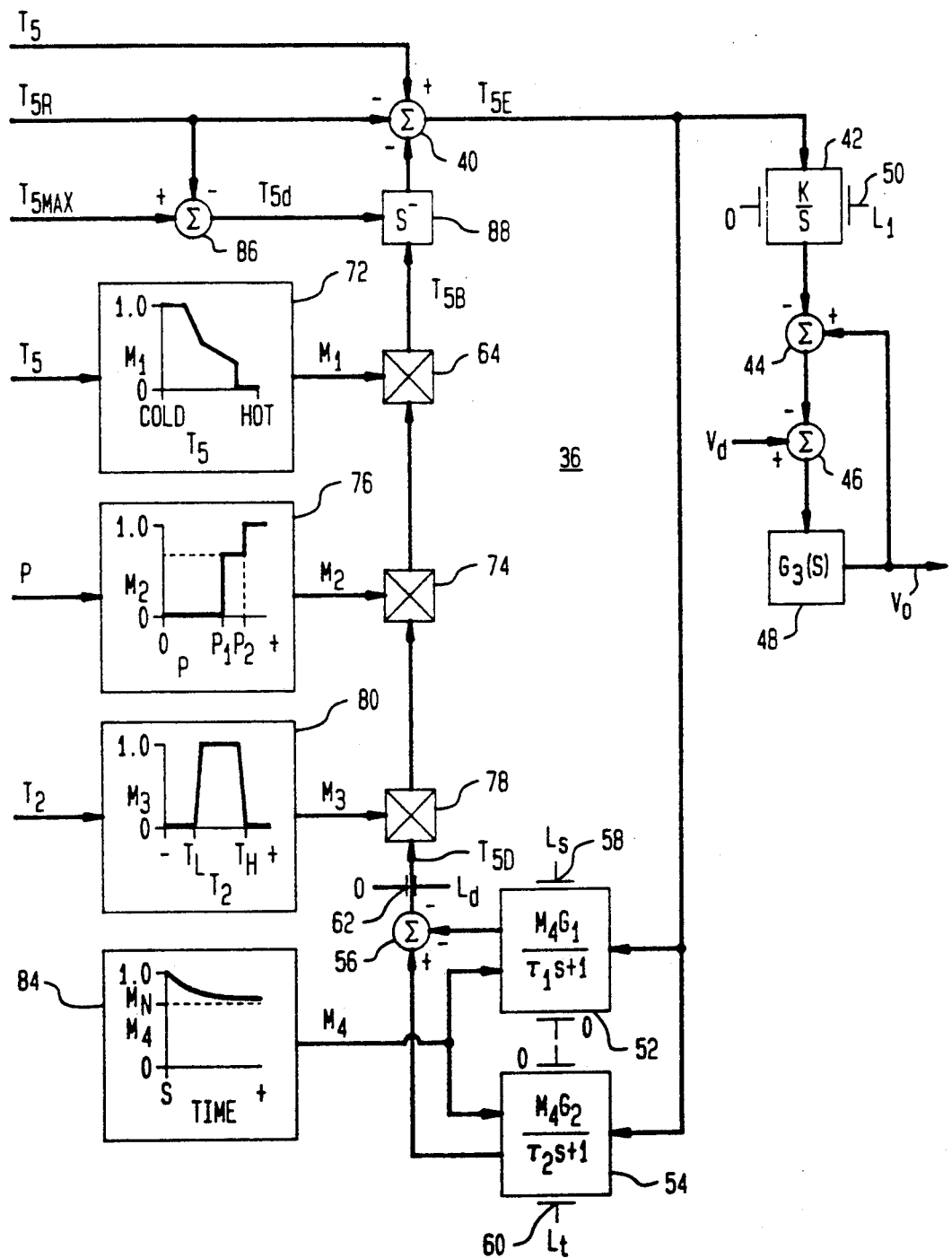
FIG. 3 is a schematic representation of the thrust droop compensation control system in accordance with a preferred embodiment for the engine illustrated in FIG. 1.

The method and control system disclosed therein is improved in accordance with the present invention as schematically represented in FIG. 3.

More specifically, FIG. 3 illustrates a thrust droop compensation control system 36 which is implemented in the controller 12 illustrated in FIG. 1. As shown in FIG. 1, a conventional turbine exit temperature ($T_5$) sensor 38 is disposed immediately downstream of the LPT 22 for measuring the temperature of the exhaust gases 28 discharged therefrom and providing a suitable signal to the controller 12 indicative of the turbine exit temperature $T_5$. The temperature $T_5$ is one input into the controller 12 which is effective for providing an output signal $V_0$ to the VEN actuator 30 for selectively varying the exhaust flow area effected by the VEN 26.

Referring again to FIG. 3, the $T_5$ signal and a reference $T_5$ signal designated $T_{5R}$ are subtracted from each other in a conventional summer 40 to generate a $T_5$ error signal designated $T_{5E}$ which is suitably channeled to an integrator 42 represented by the LaPlace transform $K/s$ wherein K is a constant gain. The output of the integrator 42 is subtracted in another summer 44 from the VEN output signal $V_0$ with the difference therebetween being channeled to another summer 46 which also receives a VEN area demand signal designated $V_d$. The difference from the summer 46 is provided to a mathematical model 48 of the VEN 26 as represented by the LaPlace transform $G_3(S)$. A conventional limiter 50 limits the output from the integrator 42 between a value of zero and a first upper limit $L_1$. This basic control of the VEN 26 is identical to that disclosed by Carpenter et al.

Carpenter et al also disclose the use of two thermal models for the HPT 20 and the stator shroud 32 which are improved in accordance with one feature of the present invention. More specifically, a thermal model 52 for the expansion of stator shroud 32 is represented by a LaPlace transform as follows:

$$\frac{M_4 G_1}{\tau_1 S + 1}$$

And, a thermal model 54 for the expansion of the HPT 20 is represented by the LaPlace transform:

$$\frac{M_4 G_2}{\tau_2 S + 1}$$

In the shroud and turbine models 52, 54, $G_1$ and $G_2$ are predetermined gains, and $\tau_1$ and $\tau_2$ are conventional time constants which are preferably proportional to fuel flow provided to the combustor 18 as disclosed in Carpenter et al (e.g. WFMC). $M_4$ represents a fourth multiplier to effectively vary the gain of these models as discussed below in accordance with one improvement due to the present invention. Both shroud and turbine models 52 and 54 receive the same error signal $T_{5E}$ as received by the integrator 42 and the respective output signals from the models 52 and 54 are subtracted in a summer 56 for generating a droop compensation signal $T_{5D}$ which is indicative of the transient curve 34 illustrated in FIG. 2 representing the difference in dynamic output of the shroud and turbine models 52 and 54 which is used for effecting thrust droop compensation.

The shroud model 52 includes a conventional limiter 58 which limits the output of the shroud model 52 between zero and a suitable upper limit $L_s$. The turbine model 54 similarly includes a limiter 60 which limits the output of the turbine model 54 between zero and a suitable upper limit $L_t$. And, a droop compensation limiter 62 is provided at the output of the summer 56 to limit the droop signal $T_{5D}$ between zero and a suitable upper limit $L_d$.

The basic method of thrust droop compensation in accordance with the present invention is similar to the one disclosed by Carpenter et al and includes providing the error signal $T_{5E}$ to the VEN 26 for adjusting the exhaust flow area of the VEN 26 and in turn adjusting thrust of the exhaust gases 28 discharged therethrough from the LPT 22. The method also includes generating the droop compensation signal $T_{5D}$ for increasing the exhaust temperature $T_5$, and in turn the error signal $T_{5E}$, for selectively increasing thrust from the engine 10. The droop signal $T_{5D}$ is based on the difference in the shroud and turbine models 52 and 54 which together provide a predetermined thermal model of the blade tip clearance transient increase as represented by the transient curve 34 in FIG. 2, which is responsive to the error signal $T_{5E}$ provided to the shroud and turbine models 52 and 54.

For example, in steady-state operation of the engine 10 wherein the HPT 20 and shroud 32 are at equilibrium temperatures, the reference temperature $T_{5R}$ and the exhaust temperature $T_5$ will have equal values and the error signal $T_{5E}$ illustrated in FIG. 3 will have a zero value which will result in no trim of the VEN 26 to compensate for thrust droop since the blade tip clearance C is at its nominal value $C_n$. However, in a power burst occurrence wherein the engine 10 is accelerated in power, the reference temperature $T_{5R}$ is conventionally changed based upon a predetermined schedule which will cause the error signal $T_{5E}$ to have a non-zero value which is used by the shroud and turbine models 52 and 54 to generate the droop signal $T_{5D}$. In conventional thrust droop compensation, the droop signal $T_{5D}$ would simply be added into the error signal $T_{5E}$ to provide compensation thereof which will suitably trim the VEN 26 to compensate for the expected thrust droop. However, if the engine 10 is hot and does not require thrust droop compensation during a power boost occurrence, thrust droop compensation is nevertheless still introduced by the conventional control system which can lead to a decrease in life of the turbines.

Accordingly, in accordance with the present invention, the improved thrust droop compensation method further includes selectively reducing the droop signal $T_{5D}$ to generate a bias signal $T_{5B}$ as shown in FIG. 3 for selectively limiting the increase in exhaust temperature $T_5$ during power boost acceleration when the exhaust temperature is above a predetermined threshold temperature $T_{5T}$ (see FIG. 4) for a predetermined time indicative of an engine which is no longer cold, but instead warm or hot wherein less or not thrust droop compensation is required. The so reduced bias signal $T_{5B}$ is instead added into the error signal $T_{5E}$ to effect the thrust droop compensation in accordance with the invention.

Figure 4:
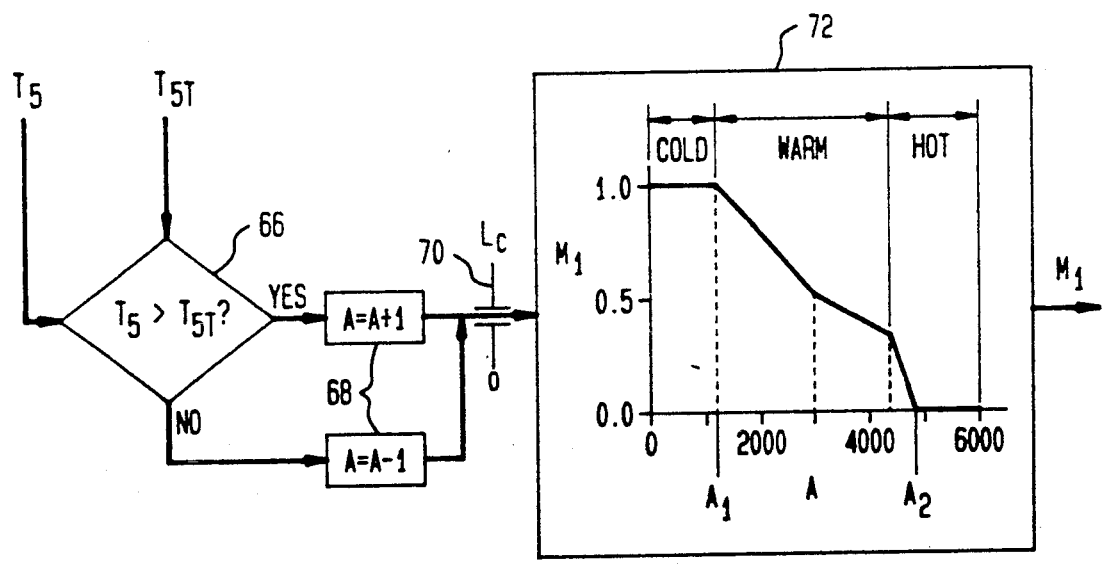
FIG. 4 is a schematic representation of a thermal history used in the control system illustrated in FIG. 3 for reducing thrust droop compensation for a warm engine.

More specifically, and referring to FIG. 3, the droop signal $T_{5D}$ may be suitably reduced by multiplying it by a first multiplier $M_1$ in a conventional first multiplier device 64 to generate the bias signal $T_{5B}$ when the engine 10 is no longer cold. FIG. 4 illustrates schematically one manner for reducing thrust droop compensation based on the thermal history of the engine 10 to determine whether it is cold, and therefore requires thrust droop compensation, or it is warm or hot requiring less or no thrust droop compensation, respectively, during a power burst. In this preferred embodiment, the method further includes comparing the exhaust temperature $T_5$ with the predetermined threshold temperature $T_{5T}$ in a conventional comparator 66 to determine whether or not it has a greater value. A conventional counter 68 is operatively joined to the comparator 66 for increasing a counter index A by one (1) for each unit of time that the exhaust temperature $T_5$ is greater than the threshold temperature $T_{5T}$, i.e. $A = A + 1$; and decreasing the counter index A by one (1) for each unit of time that the exhaust temperature $T_5$ is not greater than the threshold temperature $T_{5T}$, i.e. $A = A - 1$, but is less than or equal thereto. The comparator 66 and the counter 68, therefore, provide a running thermal history recorder to determine whether the engine 10 is cold or warm or hot based on evaluation of the exhaust temperature $T_5$. The threshold temperature $T_{5T}$ is suitably selected so that if the engine operates above that temperature for a suitable amount of time, for example during extended high power, high speed operation, then the engine is no longer considered cold and thrust droop compensation may be reduced or eliminated. However, if the exhaust temperature $T_5$ is below the threshold temperature $T_{5T}$ for a suitable length of time, for example during ground idle or low power cruise, the engine 10 will be considered cold and no reduction in thrust droop compensation will be effected.

Each time unit of the counter 68 may represent any suitable time increment such as 1/10 of a second, with the counter index A being operatively joined to a conventional limiter 70 which limits the value of the index A between zero and a suitable maximum $L_c$. The counter index A is suitably provided to a predetermined thermal schedule 72 which may be represented by a graph having the counter index A on its abscissa and the first multiplier $M_1$ on its ordinate. In the example illustrated in FIG. 4, the counter index A varies in value from zero to six thousand (6000), with six thousand representing six hundred seconds or ten minutes corresponding with the limit value $L_c$. The first multiplier $M_1$ has value ranging from 1.0 to zero, with the 1.0 value occurring for the index A from zero up to a predetermined first threshold value $A_1$ corresponding with a predetermined time, for example 1,200 units representing two minutes.

Accordingly, if the exhaust temperature $T_5$ is greater than the threshold temperature $T_{5T}$ for less than two minutes the engine 10 will be considered cold and the first multiplier $M_1$ will have a value of 1.0 and, therefore, the droop signal $T_{5D}$ will not be reduced, and will be sent full values as the bias signal $T_{5B}$ to the summer 40 in FIG. 3 for obtaining maximum thrust droop compensation. However, the first multiplier $M_1$ will have a value less than 1.0 when the index A exceeds the predetermined threshold value $A_1$ which indicates that the engine 10 is operating in a warm condition, with the first multiplier $M_1$ being suitably decreased in time as the index A increases in value up until a predetermined second threshold value $A_2$ after which the first multiplier $M_1$ has a zero value. The second threshold value $A_2$ is greater than the first threshold value $A_1$, and may be, for example, 4,800 units representing eight minutes. Between the first and second threshold values $A_1$ and $A_2$ the engine is considered warm with the first multiplier $M_1$ being suitably decreased in value from 1.0 to zero as required for particular engine designs as determined either analytically or empirically by tests. For a hot engine 10 represented by values of the index A greater than the second threshold value $A_2$, no thrust droop compensation is required and, therefore, the first multiplier $M_1$ will have a zero value which when multiplied in the first multiplier device 64 with the droop signal $T_{5D}$ will result in a zero value for the bias signal $T_{5B}$ provided to the summer 40.

Accordingly, the thermal schedule 72 preferably includes decreasing values of the first multiplier $M_1$ for increasing values of the index A. For example, the thermal schedule 72 preferably includes a first region designated "cold" wherein the first multiplier $M_1$ equals 1.0 for value of the index A between zero and up to the first threshold value $A_1$; a second region designated "hot" wherein the first multiplier $M_1$ equals zero for values of the index A above the second threshold value $A_2$; and a third region designated "warm" wherein the first multiplier $M_1$ has values less than 1.0 and greater than zero for values of the index A between the first and second threshold values $A_1$ and $A_2$.

The thermal schedule 72 is one example of obtaining the thermal history of the engine 10 to ascertain whether or not the engine is cold and requires thrust droop compensation during a power burst acceleration. Alternate thermal schedules 72 may also be used such as those based on rotor speed or engine pressure ratio or any parameter which can effectively indicate whether or not the engine 10 is in a cold condition requiring thrust droop compensation during the power burst.

Since thrust droop compensation requirements may be higher at maximum afterburner operation of the engine 10 than at maximum dry operation of the engine at intermediate rated power (IRP), the droop signal $T_{5D}$ may be additionally reduced as a function of engine output thrust or power, designated P in FIG. 3. More specifically, the droop signal $T_{5D}$ may be multiplied by a second multiplier $M_2$ in a second multiplier device 74 disposed in series with the first multiplier device 64 and the summer 56 to additionally reduce the droop signal $T_{5D}$ to generate the bias signal $T_{5B}$. The second multiplier $M_2$ is obtained from a predetermined second schedule 76 having values ranging from zero to 1.0 relative to the magnitude P of the thrust from the engine 10. The second schedule 76 may also be represented by a graph plotting the second multiplier $M_2$ on the ordinate versus power or thrust P on the abscissa. The second multiplier $M_2$ preferably has a value of zero for thrust up to a predetermined first threshold value $P_1$; a predetermined value between zero and 1.0, for example 0.75, from the first threshold value $P_1$ up to a second, greater, threshold value $P_2$; and a value of 1.0 from the second threshold value $P_2$ and greater. The first threshold value $P_1$ is preferably indicative of intermediate rated power (IRP) of the engine 10, and the second threshold value $P_2$ is indicative of additional thrust provided by operation of the afterburner 24.

Accordingly, for low thrust output of the engine 10 below IRP, the second multiplier $M_2$ has a zero value which when multiplied with a droop signal $T_{5D}$ results in a zero value for the bias signal $T_{5B}$ provided to the summer 40, and, therefore, no thrust droop compensation will be effected irrespective of the value of the droop signal $T_{5D}$ and the first multiplier $M_1$. Instead, thrust droop compensation will only be effected to a lesser extent at the intermediate rated power (IRP), and to its maximum extent during wet operation of the engine 10. The power P of the engine 10 may be represented by any conventional parameter such as, for example, power lever angle (PLA) which is typically available in an aircraft gas turbine engine. Alternatively, the PLA may be derived from the $A_8$ demand signal representing the throat area of the VEN 26, the fan speed error signal, and the WFR hold signal indicative of fuel flow to the afterburner 24, which signals are conventional and conventionally used to approximate PLA.

The engine 10 is effective for powering an aircraft through a conventionally known flight envelope at various altitudes and Mach numbers. At both low and high Mach number operation of the engine 10 and at varying altitudes, the engine 10 cannot be "cold" requiring thrust droop compensation and, therefore, thrust droop compensation should preferably be eliminated during such operation to prevent the possibility of excessive exhaust temperature $T_5$ when not required. Accordingly, the droop signal $T_{5D}$ may be multiplied by a third multiplier $M_3$ in a third multiplier device 78 as shown in FIG. 3 to generate the bias signal $T_{5B}$. The third multiplier device 78 is suitably disposed in series with the first and second multiplier devices 64 and 74 and the summer 56 so that all three multipliers $M_1$, $M_2$, and $M_3$ may be used to selectively reduce the droop signal $T_{5D}$ either singly or in combination as required.

The third multiplier $M_3$ is similarly obtained from a predetermined third schedule 80 having values ranging from zero to 1.0 to zero relative to an inlet temperature $T_2$ of the engine 10. As shown in FIG. 1, a conventional $T_2$ sensor 82 is disposed upstream of the fan 14 and is suitably joined to the controller 12 for providing thereto a signal indicative of the inlet temperature $T_2$. Since the flight envelope includes lines of constant inlet temperature $T_2$, the third schedule 80 may be based on the inlet temperature $T_2$ to define the selected regions where thrust droop compensation is to be eliminated when the engine cannot be cold, and wherein thrust droop compensation may be effected as required.

More specifically, the third schedule 80 may be in the form of a graph plotting the third multiplier $M_3$ on its ordinate versus inlet temperature $T_2$ on its abscissa. The third multiplier $M_3$ preferably has a value of zero from relatively low temperature up to a predetermined first threshold value $T_L$, a value of 1.0 between the first threshold value $T_L$ and a second, greater, threshold value $T_H$, and a value of zero above the second threshold value $T_H$. The first and second threshold values $T_L$ and $T_H$ are preselected to correspond with flight operation of the engine 10 between which the engine is susceptible to thrust droop, and therefore, requires thrust droop compensation. In one exemplary embodiment, the first threshold value $T_L$ is near 0° C. (i.e. cold inlet), and the second threshold value $T_H$ is near 100° C. (i.e. hot inlet).

Accordingly, for both cold and hot inlet temperatures $T_2$, the third multiplier $M_3$ has a zero value, and for temperatures therebetween the third multiplier $M_3$ has a value of 1.0. The droop bias signal $T_{5B}$ will correspondingly have a zero value for the hot and cold inlet temperatures $T_2$, and will have the full, unreduced, value therebetween. The particular configuration of the third schedule 80 may be in the form of step functions with the third multiplier $M_3$ having values either of 1.0 or zero. Preferably, the third multiplier $M_3$ includes relatively sharp slopes or ramps between zero and 1.0 at the first and second threshold values $T_L$ and $T_H$ to provide a suitable transition as shown in FIG. 3.

Additional thrust droop compensation may be required for a takeoff of the aircraft immediately following start-up of the engine 10 which is conventionally known as a "tiger-start." In such a condition, the engine 10 is at its lowest, cold temperature just before it is started, and, therefore, a tiger-start takeoff will provide a worst case transient tip clearance variation requiring maximum thrust droop compensation. Additional thrust droop compensation for a tiger-start takeoff is preferably provided by suitably modifying the bias signal $T_{5B}$ using the fourth multiplier $M_4$ illustrated in FIG. 3 obtained from a predetermined fourth schedule 84 for providing maximum thrust droop compensation at a tiger-start takeoff of the engine 10. In the preferred embodiment illustrated in FIG. 3, the fourth schedule 84 may be represented by a graph plotting the fourth multiplier $M_4$ on the ordinate and time on the abscissa, with time beginning at startup, designated S, of the engine 10 and increasing therefrom. The fourth multiplier $M_4$ preferably has a maximum value of 1.0 and decreases continuously, for example exponentionally, to a nominal value $M_N$. The fourth multiplier $M_4$ is suitably provided to both shroud and turbine models 52 an 54 and is used as a multiplier for the respective gains $G_1$ and $G_2$ so that the resulting blade tip clearance transient increase modeled by the difference between the shroud and turbine models 52 and 54 includes a gain, both $G_1$ and $G_2$, against which is applied the fourth multiplier $M_4$. In other words, variable gains represented by the product of the fourth multiplier $M_4$ and the initial gains $G_1$ and $G_2$ are provided in the models 52 and 54 to provide a maximum level of thrust droop compensation initially at engine startup in the event a tiger-start is required, but after a suitable time at idle, the maximum thrust droop compensation effected by the models 52, 54 will decrease to the nominal value associated with the nominal value of the fourth multiplier $M_N$ which may be about 0.75, for example. Whereas the first three multipliers $M_1$, $M_2$, and $M_3$ are merely scalar factors applied to the droop signal $T_{5D}$, the fourth multiplier $M_4$ is utilized directly in the models 52 and 54 which dynamically affects the droop signal $T_{5D}$ generated therefrom.

Since the thrust droop compensation system 36 uses a bias signal $T_{5B}$ to increase exhaust temperature $T_5$, it is preferred to establish a maximum limit on the exhaust temperature $T_5$ which should not be exceeded even if called for by the models 52 and 54. Accordingly, the control system 36 is preferably effective for limiting the bias signal $T_{5B}$ to prevent the exhaust temperature $T_5$ from exceeding a predetermined maximum temperature $T_{5MAX}$. This may be accomplished, for example, by generating a difference signal $T_{5d}$ between the reference temperature $T_{5R}$ and the maximum temperature $T_{5MAX}$ suitably provided to a conventional summer 86, and then adding the minimum of the difference signal $T_{5d}$ and the bias signal $T_{5B}$ into the error signal $T_{5E}$ in the summer 40 to effect thrust droop compensation. A conventional minimum selector 88, designated $S^-$, is suitably disposed in series between the summer 40 and the first multiplier device 64 and suitably joined to the summer 86 so that the minimum of either the difference signal $T_{5d}$ or the bias signal $T_{5B}$ is selected and provided to the summer 40. In this way, the bias signal $T_{5B}$ will be provided by the selector 88 to the summer 40 as long as the $T_{5MAX}$ limit is not exceeded, and when exceeded the difference signal $T_{5d}$ will instead be provided to the summer 40 for limiting the amount of thrust droop compensation effected.

The thrust droop compensation control system 36 may further include if desired a suitable switch to disable the system 36 when desired either manually or automatically so that the engine 10 operates without thrust droop compensation if desired. Such a switch may be provided at any convenient location within the system 36 to eliminate the bias signal $T_{5B}$ from the summer 40.

In the preferred embodiment of the present invention, the control system 36 is implemented directly within a digital electronic control (DEC) of the controller 12, for example by suitable software algorithms therein. The various sensors used in the control system 36 are conventional, and the engine 10 is otherwise conventionally operated. Accordingly, the system 36 may be relatively easily incorporated into the controller 12 to obtain the required inputs to generate the required outputs for selectively compensating the error signal $T_{5E}$ for trimming the VEN 26 to effect thrust droop compensation when required during power burst acceleration of the engine 10.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. For a gas turbine engine having a compressor powered by a high pressure turbine (HPT), a fan powered by a low pressure turbine (LPT), an afterburner, and a variable area exhaust nozzle (VEN) for discharging exhaust gases received from said LPT to generate thrust, a control system for compensating for droop in thrust due to a transient increase in tip clearance of said HPT comprising:

means for providing an error signal $T_{5E}$ to said VEN for adjusting exhaust flow area of said VEN and in turn adjusting thrust of said exhaust gases discharged therethrough from said LPT, said error signal $T_{5E}$ including a difference between temperature $T_5$ of said LPT exhaust gases and a predetermined reference temperature $T_{5R}$;

means for generating a droop compensation signal $T_{5D}$ for increasing said exhaust temperature $T_5$ to increase said thrust, said droop signal $T_{5D}$ being based on a predetermined model of said tip clearance transient increase and being responsive to said error signal $T_{5E}$;

means for selectively reducing said droop signal $T_{5D}$ to generate a bias signal $T_{5B}$ for selectively limiting said increase in exhaust temperature $T_5$ when said exhaust temperature $T_5$ is above a predetermined threshold temperature $T_{5T}$ for a predetermined time; and means for adding said bias signal $T_{5B}$ into said error signal $T_{5E}$ to effect said thrust droop compensation.

2. For a gas turbine engine having a compressor powered by a high pressure turbine (HPT), a fan powered by a low pressure turbine (LPT), an afterburner, and a variable area exhaust nozzle (VEN) for discharging exhaust gases received from said LPT to generate thrust, a method of compensating for droop in thrust due to a transient increase in tip clearance of said HPT comprising:

providing an error signal $T_{5E}$ to said VEN for adjusting exhaust flow area of said VEN and in turn adjusting thrust of said exhaust gases discharged therethrough from said LPT, said error signal $T_{5E}$ including a difference between temperature $T_5$ of said LPT exhaust gases and a predetermined reference temperature $T_{5R}$;

generating a droop compensation signal $T_{5D}$ for increasing said exhaust temperature $T_5$ to increase said thrust, said droop signal $T_{5D}$ being based on a predetermined model of said tip clearance transient increase and being responsive to said error signal $T_{5E}$;

selectively reducing said droop signal $T_{5D}$ to generate a bias signal $T_{5B}$ for selectively limiting said increase in exhaust temperature $T_5$ when said exhaust temperature $T_5$ is above a predetermined threshold temperature $T_{5T}$ for a predetermined time; and adding said bias signal $T_{5B}$ into said error signal $T_{5E}$ to effect said thrust droop compensation.

3. A thrust droop compensation method according to claim 2 wherein said droop signal $T_{5D}$ reducing step includes:

comparing said exhaust temperature $T_5$ with said predetermined threshold temperature $T_{5T}$;

increasing a counter index A by one for each unit of time said exhaust temperature $T_5$ is greater than said threshold temperature $T_{5T}$;

decreasing said counter index A by one for each unit of time said exhaust temperature $T_5$ is not greater than said threshold temperature $T_{5T}$; and multiplying said droop signal $T_{5D}$ by a first multiplier $M_1$ to generate said bias signal $T_{5B}$, said first multiplier $M_1$ being obtained from a predetermined first schedule having values ranging from 1.0 to zero relative to said counter index A, and having a value less than 1.0 when said index A exceeds a predetermined first threshold value $A_1$ corresponding with said predetermined time.

4. A method according to claim 3 wherein said predetermined first schedule includes decreasing value of $M_1$ for increasing values of said index A, and a first region wherein said first multiplier $M_1$ equals 1.0 for said index up to said first threshold value $A_1$ when said engine is cold, a second region wherein said first multiplier $M_1$ equals zero for said index A above a second threshold value $A_2$ greater than said first threshold value $A_1$ when said engine is hot, and a third region wherein said first multiplier $M_1$ has a value less than 1.0 and greater than zero for said index A between said first and second threshold value $A_1$ and $A_2$ when said engine is warm.

5. A method according to claim 4 wherein said droop signal $T_{5D}$ reducing step further includes:

multiplying said droop signal $T_{5D}$ by a second multiplier $M_2$ to generate said bias signal $T_{5B}$, said second multiplier $M_2$ being obtained from a predetermined second schedule having values ranging from zero to 1.0 relative to magnitude of said thrust, said second multiplier $M_2$ having a value of zero for thrust up to a first threshold value $P_1$, a value between zero and 1.0 from said first threshold value $P_1$ up to a second, greater, threshold value $P_2$, and a value of 1.0 from said second threshold value $P_2$ and greater.

6. A method according to claim 5 wherein said thrust first threshold value $P_1$ is associated with intermediate rated power (IRP) of said engine for obtaining maximum dry thrust, and said second threshold value $P_2$ is associated with operation of said afterburner.

7. A method according to claim 5 wherein said droop signal $T_{5D}$ reducing step further includes:

multiplying said droop signal $T_{5D}$ by a third multiplier $M_3$ to generate said bias signal $T_{5B}$, said third multiplier $M_3$ being obtained from a predetermined third schedule having values ranging from zero to 1.0 to zero relative to an inlet temperature $T_2$ of said engine, said third multiplier $M_3$ having a value of zero for said inlet temperature $T_2$ up to a first threshold value $T_L$, a value of 1.0 between said first threshold value $T_L$ and a second greater, threshold value $T_H$, and a value of zero above said second threshold value $T_H$.

8. A method according to claim 7 wherein said first and second inlet temperature threshold values $T_L$ and $T_H$ are preselected to correspond with flight operation of said engine between which said engine is susceptible to said thrust droop.

9. A method according to claim 7 further including limiting said bias signal $T_{5B}$ to prevent said exhaust temperature $T_5$ from exceeding a predetermined maximum temperature $T_{5MAX}$.

10. A method according to claim 9 wherein said bias signal $T_{5B}$ is effected by a fourth multiplier $M_4$ obtained from a predetermined fourth schedule for providing maximum thrust droop compensation at startup of said engine.

11. A method according to claim 10 wherein said bias signal $T_{5B}$ limiting step includes:

generating a difference signal $T_{5d}$ between said reference temperature $T_{5R}$ and said maximum temperature $T_{5MAX}$; and adding the minimum of said difference signal $T_{5d}$ and said bias signal $T_{5B}$ into said error signal $T_{5E}$ to effect said thrust droop compensation.

12. A method according to claim 10 wherein said tip clearance transient increase model includes a gain, and said fourth multiplier $M_4$ is applied to said gain.

* * * * *